United States Patent [19]

Cano

[11] 4,137,870
[45] Feb. 6, 1979

[54] WRAP-AROUND ANIMAL RESTRAINT

[76] Inventor: Mary A. Cano, 2407 Lomitas La., Santa Rosa, Calif. 95405

[21] Appl. No.: 761,632

[22] Filed: Jan. 24, 1977

[51] Int. Cl.² ............................................. A01K 29/00
[52] U.S. Cl. ...................................................... 119/96
[58] Field of Search .......................... 119/96, 19, 1, 160, 119/96.1

[56] References Cited

U.S. PATENT DOCUMENTS

| | | | |
|---|---|---|---|
| 3,150,640 | 9/1964 | Nevitt | 119/96 |
| 3,547,079 | 12/1970 | Bassett | 119/96 |
| 3,850,144 | 11/1974 | Springer et al. | 119/19 |
| 4,008,687 | 2/1977 | Keys | 119/1 |

Primary Examiner—Hugh R. Chamblee
Attorney, Agent, or Firm—George B. White

[57] ABSTRACT

A pair of sheets are cut so that each is wider at one end and narrower at the other end, and are united along one longitudinal edge and at the wider end and at a portion along the other longitudinal edge, so that the wider end forms a bag and the free portions of the sheets can be wrapped around the animal in selective overlapping relation according to the size of the animal, forming a neck band near the head of the animal and a tight confining wrapping around the body of the animal; bristle type adhesive means are provided adjacent the free edge of one of the sheets, and the surface of the other sheet is adapted to coact with the bristle adhesive slip of the Velcro type, so that it firmly holds the sheets at any selected overlapping attitude; a plurality of strips are provided to strap around the wrapped restraint whereby the wrapping may be unwrapped and opened at any selected body area, without releasing the overall restraints; at spaced locations flap covered openings are provided for access to the body of the animal for treatment.

4 Claims, 3 Drawing Figures

WRAP-AROUND ANIMAL RESTRAINT

BACKGROUND OF THE INVENTION

For transportation of animals and particularly injured or sick animals for treatment usually a blanket is used, the edges of which are handled as carriers, but the animal can freely turn around and struggle for freedom and frequently escape or scratch or injure the person carrying the animal; also it is necessary for the veterinarian to remove the struggling animal from the blanket for examination and treatment without restraint.

It is the primary object of the invention to provide a simple wrap-around restraint which can be quickly wrapped around the animal so tightly that the animal cannot struggle free, and wherein the restraining sheets can be quickly secured so as to hold the animal in position without possibility of escape, and in which the wrap-around sheets are overlapping to a selected degree, so as to tightly conform to the shape or contour of the animal, and particularly tightly engaging the neck of the animal thereby to keep the head of the animal exposed for free breathing, and which can be quickly unwrapped at selected limited areas for examination or treatment.

The primary feature of the invention is the providing of a device which is similar to a bag at one end but which has free edges capable of overlapping any selected distance to conform to the shape of an animal therein, and on which separable adhesive means are provided to hold the said overlapping portions in wrapping position thereby to facilitate the carrying of the restrained animal without possibility of excessive struggling or escape, and to facilitate the handling and observation and treatment of such animal.

DETAILED DESCRIPTION

Figure 1:
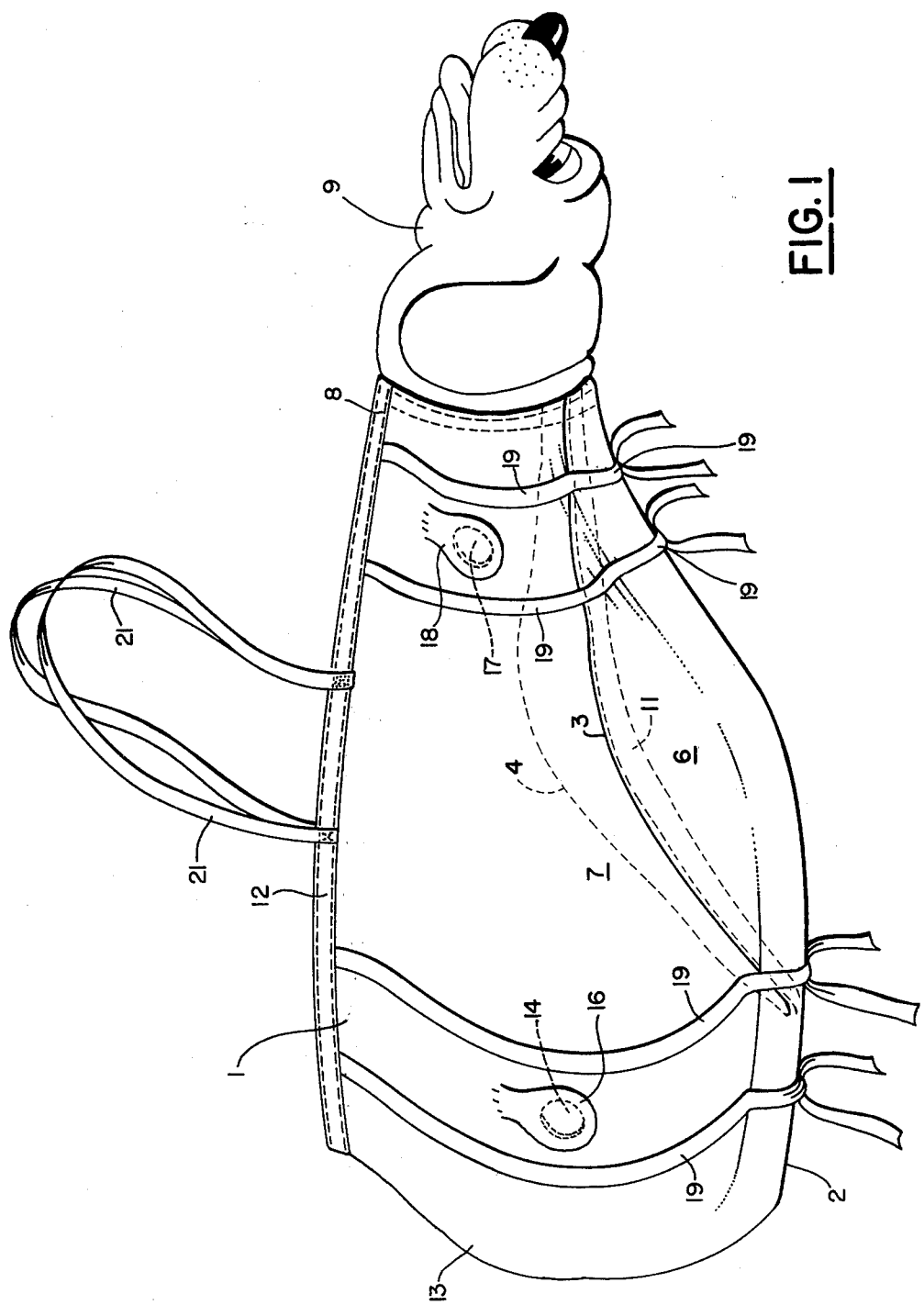
FIG. 1 is a side view of the restraint with animal therein.
Figure 2:
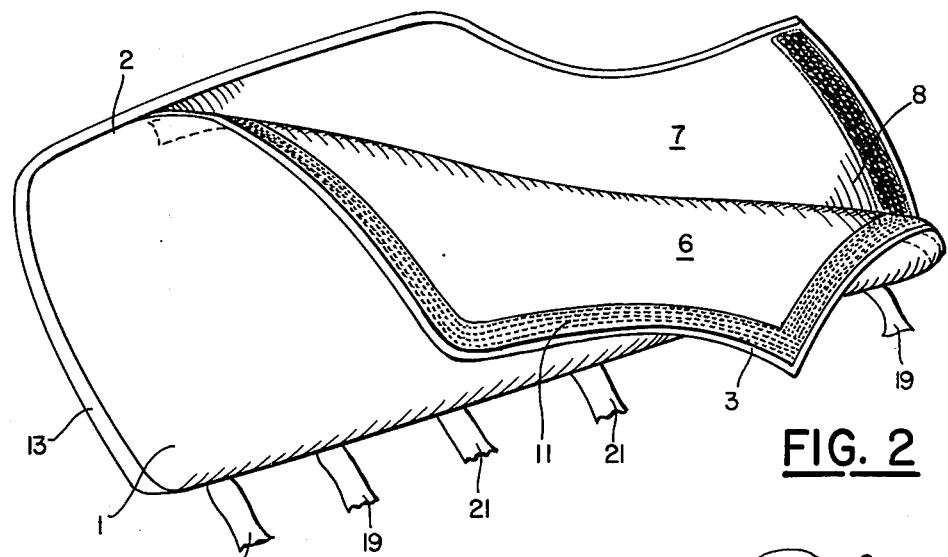
FIG. 2 is a perspective of the open restraint viewing toward the closed end thereof.
Figure 3:
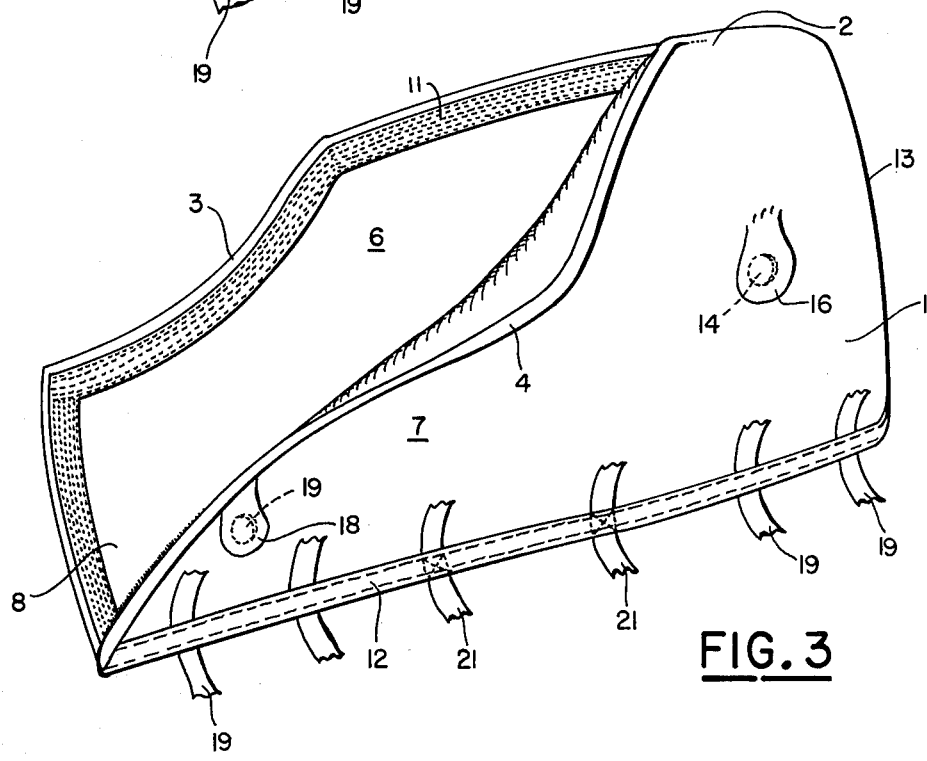
FIG. 3 is a perspective view of the open restraint viewing toward the neck end thereof.

The device herein includes a bag the bottom end 1 of which is closed all around by a partially closed edge 2 so as to leave free edges 3 and 4, to permit the wrapping of sides 6 and 7 of the bag. These sides are wider at the bottom end 1 and narrow at the neck portion 8 so that the neck portion 8 can be tightly wrapped around the neck of an animal 9, while the animal is examined or confined. Along at least one of the edges, in this illustration the edge 3, is a suitable separable adhesive strip 11, in this illustration a bristle adhesive of the Velcro type. The outer surface of the other side 7 is such as to be tighly engageable by the adhesive strip 11 and to hold the sides 6 and 7 in selected overlapping position.

In the herein illustrative embodiment the bag 1 is made of two separate sheets 6 and 7, and the two sides are united at one edge from the foot end to the neck 8 by a strip 12, and are united at the edges 13 at the bottom end 11, and along the partially closed portion 2, leaving the edges 3 and 4 free for wrapping around the animal. The sheet 6 in this illustration is made of firm and smooth vinyl or other flexible plastic material. The other sheet 7 in this embodiment is made of flannel or wool so that the outer surface of the sheet 7 has fuzzes equivalent to short bristles to be engaged by the bristle type adhesive strip 11. An opening 14 is provided in the body portion of the bag and is covered by a flap 16. And another opening 17 is provided near the neck portion by a flap 18, which flaps are loose to allow uncovering the respective holes for access for the purpose of inserting a needle or giving other treatment.

In operation the bag is fully opened and the animal is quickly placed in the bag, with legs toward the closed edge and the strip 12 and the back to the open side, as shown in FIG. 1. First the neck portion of sheet 7 is wrapped around the neck of the animal tightly and the corresponding neck portion of the side 6 is wrapped over it so as to accomplish the adhesive arrangement around the neck. Then the body portion of the side 7 is wrapped over the back of the animal and inside the bag and under the other side 6, and finally the outer side 6 is wrapped over the animal and over the surface of the other side 7, and its adhesive bristle strip 11 is pressed on the outer surface of the wrapped side 7 to hold the sheets wrapped around the animal. In this manner any part of the back of the animal can be selectively uncovered and treated without interference by the legs of the animal.

If there is need for further restraint, strips 19 suitably spaced along the bag are wrapped around and tied so as to prevent the escape of the animals if any part of the bag is opened for examination and treatment. Handle strips 21 also are spaced apart and extend so as to form handles whereby the wrapped animal can be carried. Thus any selected area of the wrapped sheets can be selectively unwrapped for examination and treatment without releasing the animal from the restraint.

I claim:
1. A wrap-around animal restraint comprising
   a bag including a first side and a second side closed at one end and along one longitudinal edge thereof, the other edges of the sides of the bag being open,
   each side having an inner surface and an outer surface,
   the first side being free at its open edge to be under the edge of the second side and wrapped around an animal inside said bag tightly thereby to immobilize said animal in said bag,
   said second side being free at its open edge to be wrapped over the outer surface of said first side tightly,
   and releasable adhesive means adjacent the free edge of the second side of the bag adhesively engaging the outside surface of the wrapped first side spaced from the free edge of the said first side sufficiently to restrain said first side in tightly wrapped position.
2. The animal restraint as specified in claim 1, and each of said sides of said bag being wider at the closed end and narrow at the other end, said narrow end forming an adjustable neck band when wrapped around the neck of an animal.
3. The animal restraint specified in claim 1, and said sides being a pair of sheets united along said one longitudinal edge and at said bottom edge to form the closed portion of the bag,
   said releasable adhesive means being a strip on the inside along the open longitudinal edge of said second sheet the outer surface of the other first sheet being adhesively engageable by said strip at selected overlapping wrapped position.
4. The animal restraint specified in claim 1, and said adhesive strip consisting of adhesive bristles of the Velcro type,
   and the outer surface of the first side of the bag being engageable by said bristles adhesively at any selected portion there when wrapped.

* * * * *